Oct. 3, 1961 G. L. GOUGH, JR 3,003,094
TAPE CONTROL SYSTEM
Filed Sept. 18, 1957 5 Sheets-Sheet 1

INVENTOR
GEORGE L. GOUGH
BY R.C. Terry
ATTORNEY

FIG. 2

INVENTOR
GEORGE L. GOUGH

FIG. 3

INVENTOR
GEORGE L. GOUGH
BY R.C. Terry
ATTORNEY

INVENTOR
GEORGE L. GOUGH
BY R C Terry
ATTORNEY ated Oct. 3, 1961

3,003,094
TAPE CONTROL SYSTEM
George L. Gough, Jr., Glenview, Ill., assignor to Teletype
Corporation, Chicago, Ill., a corporation of Delaware
Filed Sept. 18, 1957, Ser. No. 684,718
1 Claim. (Cl. 318—162)

This invention relates to automatic controls for machine tools and more particularly to apparatus for controlling machine tools through the medium of perforated indicia in tapes.

In the machine tool industry numerous systems have been suggested for automatically controlling the tools from a program indicating medium, such for example as punched tape. Some of the apparatus which has been proposed heretofore has had the desired accuracy of control but lacked facilities for high speed interpretation of the data representing the program which the machine was to follow. Other apparatus which was capable of interpreting a program rapidly did not control the machine with sufficient accuracy or if it did interpret rapidly and control operations accurately it was too complicated to make its manufacture economical.

Furthermore, in the past, the preparation of a tape for controlling the machine has been too costly to warrant its extensive use. This excessive cost results, at least in part, from the fact that in the usual type of machine control tapes, one channel is assigned to each possible command which it might be desired to issue. Consequently, such tapes have an unwarranted width in order to transmit a large enough number of instructions to the machine to make the machine fully automatic. In addition, such tapes require special interpreting mechanisms.

The punched tape for controlling a machine tool should also be capable of producing a printed record of the desired program which the machine tool is to follow. This feature, in the past, was difficult to achieve. Also, the programming, i.e. preparation of a punched tape for controlling the machine, required a high degree of skill.

An object of this invention is to provide a control means for a machine tool which can be easily programmed from a drawing.

Another object of this invention is to provide a simple mechanism for positioning the movable elements of a machine tool in accordance with coded indicia in a programmed tape.

Another object is to provide a counter controlled unit which may be utilized with any type of reversible electric motor.

Still another object of this invention is to provide a system of control indicia which can be utilized with standard teletypewriter code symbols thereby to simplify the programming of the tape.

One illustrative embodiment of the present invention comprises a tape reader capable of reading a five unit code of the "Baudot" type. This code has been used in printing telegraphy for a number of years and will control a printing apparatus with great accuracy at high speeds. Tapes used in controlling transmitting apparatus have five channels or longitudinal zones which may be perforated or may be left imperforate to indicate what is known in the printing telegraph art as marking or spacing conditions. A tape reader of the type used in the printing telegraph art has been modified for use in the present apparatus so that, instead of transmitting marking or spacing pulses to control a printing machine, it will either actuate or will not actuate a series of five transfer contacts.

The modified tape reader is connected to a control unit including a diode matrix into which the tape reader feeds the information which it has read from the tape. The diode matrix has ten input leads and could have as many as thirty-two output leads, any one of which may be rendered active by a selected permutative setting of the transfer contacts in the tape reader. Only nineteen commands are necessary to control the apparatus illustrated herein. Therefore only nineteen output leads are provided in the present apparatus. Ten of these output leads are assigned to the digits one to nine and zero and the remaining nine are utilized for controlling the machine operation or for controlling the tape reader to cause it to perform its functions. The control unit responds to pulses on the output leads of the matrix which are not assigned to the digits. The control unit, through suitable circuitry, feeds information to the drive mechanism of the machine tool to control the direction and plane in which the tools, or a table which supports a blank to be worked upon by the tools, will move.

The pieces of information that are impressed upon the tape, in addition to controlling the drive mechanism for the machine tool, may also control a printing telegraph machine, in order that a complete printed record of the machine tool controlling program may be obtained. This will necesitate the inclusion of some code combinations for controlling exclusively the printing telegraph machine, such as those that produce carriage return and line feed operations. Such code combinations will not interfere with the control of the machine tool.

The ten output leads of the matrix which are assigned to the digits are connected to a register, capable of storing five digits in each of two sections. This register is connected to an electronic counter which will store the same information as that put into the register. Each of the movable machine elements is equipped with a mechanism for measuring the number of increments of movement imparted to it. This number of increments of movements is fed back to the electronic counter and after a number has been read out of the counter, which number had been registered in the counter under control of the registers, the control circuit will initiate another reading operation by the reader to cause the reading of the next piece of information that is on the tape. Thus a tape which may be punched in accordance with information fed into a printing telegraph printer and which may be used to print a record of the machine control information will also suitably control all of the drive mechanisms of a machine, for example, an automatic milling machine.

A more complete understanding of the invention may be had by reference to the following detailed description when considered in conjunction with the accompanying drawings wherein.

Figures 1, 6:
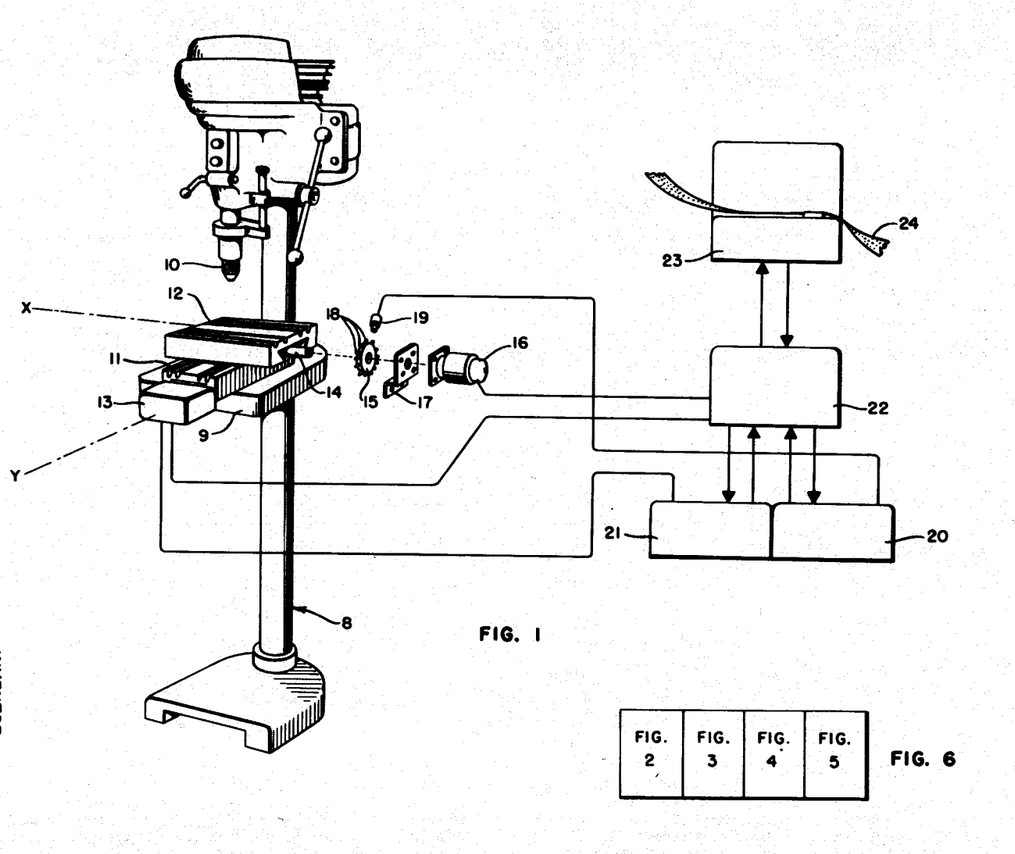
FIG. 1 is a view, partly in perspective and partly in diagrammatic form, of a machine embodying the invention, and FIGS. 2 to 5, when placed side by side in accordance with the diagram in FIG. 6 disclose in diagrammatic form all of the circuitry necessary for controlling the machine operation.

By referring first to FIG. 1 it will be seen that the apparatus includes a pedestal for a machine tool which is designated generally by the numeral 8. The pedestal 8 supports a base 9 fixedly mounted upon it. The pedestal 8 also carries at its upper end a conventional driving mechanism for a chuck 10 in which a milling tool (not shown) may be mounted. A support member 11 is mounted for movement on the base 9 along what may be termed a "Y" axis or vertical plane, suitable guide ways being provided for guiding the support member 11 in its movement toward and away from the pedestal 8. A drive unit 13 is connected to the base 9 and will serve to drive the support member 11 toward and away from the pedestal 8 on the "Y" axis or in a vertical plane.

The support member 11 carries a blank supporting table 12 which is movable transversely of the support member 11 on what may be termed an "X" axis or horizontal plane. For the sake of simplifying the disclosure the drive for the blank supporting table 12 is the only one of the drives which will be described in detail. It will be understood, however, that similar drives may be provided for the support member 11 as indicated at 13 or for the chuck 10.

The drive for the blank supporting table 12 comprises a shaft or lead screw 14 which carries a commutator 15 and which may be driven by a reversible D.C. shunt motor 16. A bracket 17 suitably secured to the support member 11 supports the motor 16 and when the motor is energized to drive in either its clockwise or counterclockwise direction it will move the blank supporting table 12 transversely of the support member 11 along the horizontal plane or "X" axis. The commutator 15 has a plurality of equally spaced pins 18 extending from it, which, when the shaft 14 is rotated will move past a detector or pick-off device 19. This pick-off device is interconnected with a suitable electronic counter 20 and each time one of the pins 18 passes the pick-off device 19 a pulse will be transmitted to the counter 20 to count the increments of rotation of the shaft 14, whether the shaft is rotating in a clockwise or a counterclockwise direction to drive the blank supporting table to the right or to the left as viewed in FIG. 1.

The drive unit 13 has the same type of equipment as the drive for the blank supporting table 12 which has been described in detail, and will control another electronic counter 21. The motor 16, and the motor for driving the drive unit 13 are interconnected by suitable circuits to a control unit 22 which is in turn interconnected by suitable circuitry with a tape reader 23 that reads a tape 24 and feeds information derived from the tape 24 to the control unit 22.

The tape reader 23 receives its commands from the programmed tape 24 and passes the intelligence which it has received along to the control unit 22 where it is converted from a multi-unit code to a single line command to control either one of the electronic counters 20 or 21 or to give a command to the motor 16 or to the corresponding motor in the drive unit 13. After the counters 20 and 21 have been set, the motors are started to operate and the control is passed to the counters. The speed of the motors may be varied depending on the distance traveled toward a target point as determined by rotation of the drive shaft, which may comprise lead screws, such as lead screw 14, and their associated commutators, such as commutator 15. It should be understood, of course, that while only the "X" and "Y" axis controls have been illustrated, a "Z" axis control, for controlling movement of the chuck 10 toward and away from the work, is omitted herein for reasons of simplicity and clarity and to avoid unnecessary repetition.

In order to use the smallest possible number of commands and still adequately control the machine, the machine is set normally to operate on the "X" axis in a positive direction at slow speed. However, the machine is normally not operating and therefore is in an off condition. In order to activate the apparatus and supply power to one of the motor units a signal must be transmitted to the apparatus to activate it. This signal is "G" indicating that the apparatus is to "go." When this command is transmitted to the apparatus it will start to go along its "X" axis in a positive direction at slow speed. Now if it is desired to shift the travel of the blank to a vertical or "Y" axis the letter "V" is fed into the control unit. If the direction of travel desired is negative then the code representation of "minus" ("—") is transmitted. Furthermore, if it is desired to feed the apparatus at a fast rate of speed to attain a rapid traverse of the work table in any of its directions the letter "F" is transmitted to the apparatus. Also, if it is desired to impart perpendicular movement to the chuck bearing the tool then the command "Z" indicating the "Z" axis is transmitted to the control devices. In addition to these five controls the digits 1 to 9 and 0 are also used to set the counters for controlling the desired traverse of each of the movable machine elements. Thus the actual machine controlling commands number 15 leaving four possible commands which will not control the machine itself but rather will feed back to the tape reader 23 and control it.

Figure 2:
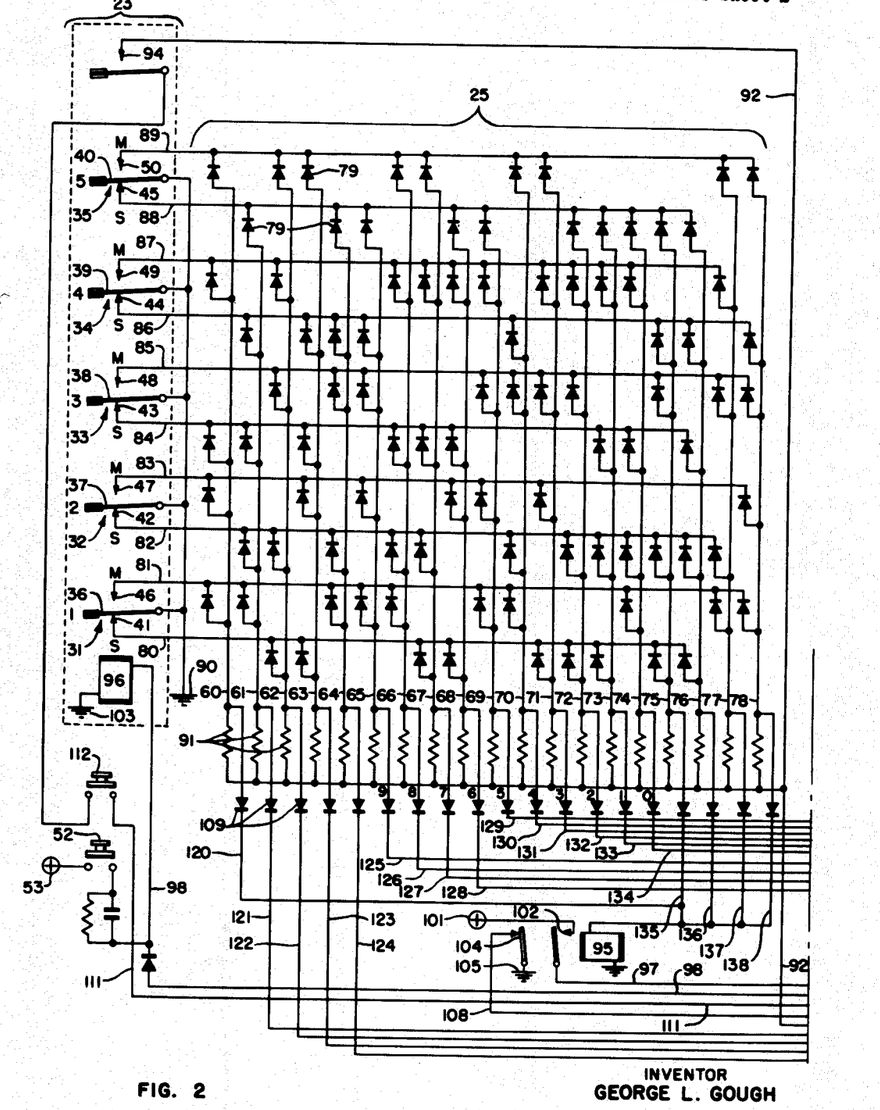

Referring now to the tape reader 23 and control unit 24 depicted in FIG. 2, it will be seen that the selection elements of the tape reader 23 are shown as a plurality of transfer contact sets 31 to 35. These transfer contact sets 31 to 35 are selectively operated in accordance with the "Baudot" code sensed by the tape reader 23, in the well known manner, to establish a circuit through a diode matrix 25 to activate one particular output lead of the matrix at a time.

The general principles of the type of diode matrix shown in FIG. 2, is not new in the printing telegraph art for converting code signals from one form to another. The particular form of matrix adopted for use in the present apparatus receives its input from the contact sets 31 to 35 of the reader 23. The contact sets 31 to 35 have movable contacts 36 to 40, break or "spacing" contacts 41 to 45 and make or "marking" contacts 46 to 50, respectively. The contact sets 31 to 35, are assigned to the channels or longitudinal zones 1 to 5 of the tape, respectively, and may be selectively set to indicate a "marking" condition or a "spacing" condition. Therefore, the contact sets 31 to 35 in FIG. 2, have also been assigned the numerals 1 to 5, respectively, the make or marking contacts 46 to 50 have been designed "M" and the break or spacing contacts 41 to 45 have been designated "S."

The matrix 25 has nineteen output leads 60 to 78 which are interconnected with a plurality of input leads 80 to 89 through a plurality of diodes 79 in a pattern such that the setting of the movable contacts 36 to 40 of contact sets 31 to 35 with respect to their respective marking (46 to 50) or spacing (41 to 45) contacts will connect ground at 90 through the pattern to all except one of the output leads 60 to 78. Each of the output leads 60 to 78 is connected through an individual resistor 91 to a conductor 92 that is connected to positive battery at a source 93 (FIG. 5) by a "stop" contact 94 (FIG. 2) in the tape reader 23 when the stop contact is closed and a motor and brake control relay 100 (FIG. 5) is de-energized. This circuit extends through a normally closed pair of contacts 110 and a lead 111 and a main machine control switch 112 (FIG. 2) to the stop contact 94.

The output leads 60 to 78 are allocated to various commands to be transmitted to the control unit 22 which commands are "SPACE," "V," for vertical; "—," reverse direction of drive units; "F," fast speed; "G" go; 0, 1, 2, 3, 4, 5, 6, 7, 8, 9, "FIGURES," "LETTERS," "LINE FEED," and "CARRIAGE RETURN," respectively. The "SPACE," "FIGURES," "LETTERS," "LINE FEED" and "CARRIAGE RETURN" commands, when they are fed through the matrix 25, will each cause a reader control relay 95 to be energized. The reader control relay 95 has the function of supplying a pulse to a stepping magnet 96 in the reader to cause it to step the reader to read the next piece of information on the tape 24; when a non-operating function such as "SP," "FIGS," "LTRS," "LF," or "CR" is sensed. The circuit for energizing stepping magnet 96 of the reader is completed over leads 97 and 98 and through a normally closed contact 99 of the brake control relay 100 (FIG. 5) and the circuit connects positive battery from a source 101 (FIG. 2) over said leads and contact 102 of relay 95 through the winding of the stepping magnet 96 to ground at 103. The energization of the reader control relay 95 also opens its contacts 104 to break a circuit from ground at 105 over a lead 108 to normally closed contacts 106 of a solenoid control relay 107 (FIG. 4) in the control unit 22 the purpose of which will become apparent as the description progresses.

Each of the output leads 60 to 78 are connected individually through a diode rectifier 109 to the leads 120 to 138 respectively, that it activates when it is supplied with positive battery through the diode matrix 25. The rectifiers 109 thus serve to direct current originating at the positive battery source 93 through an ungrounded one of the output leads 60 to 78 over leads 120, 135, 136, 137, and 138 associated with output leads 60, 75, 76, 77 and 78, respectively, to the relay 95 and over leads 121 to 134 associated with output leads 61 to 74, respectively, to various instrumentalities in the control unit 22.

Figure 3:
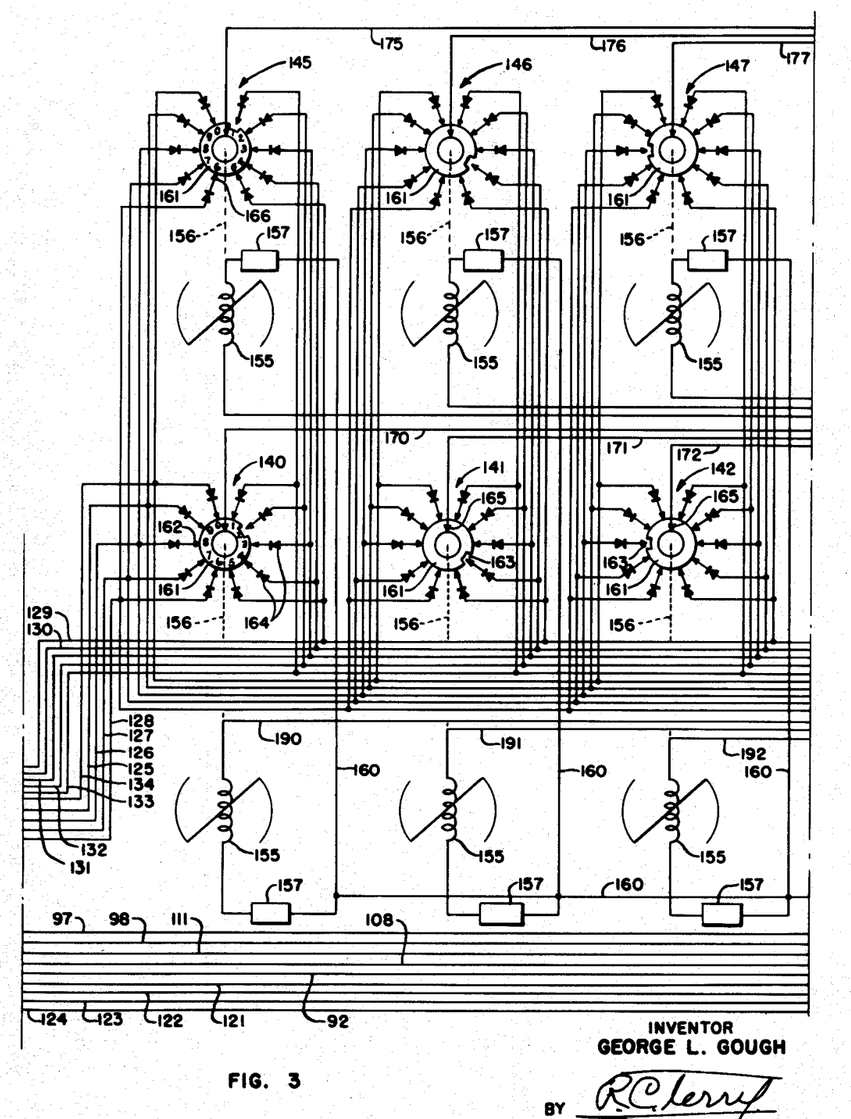
Figure 4:
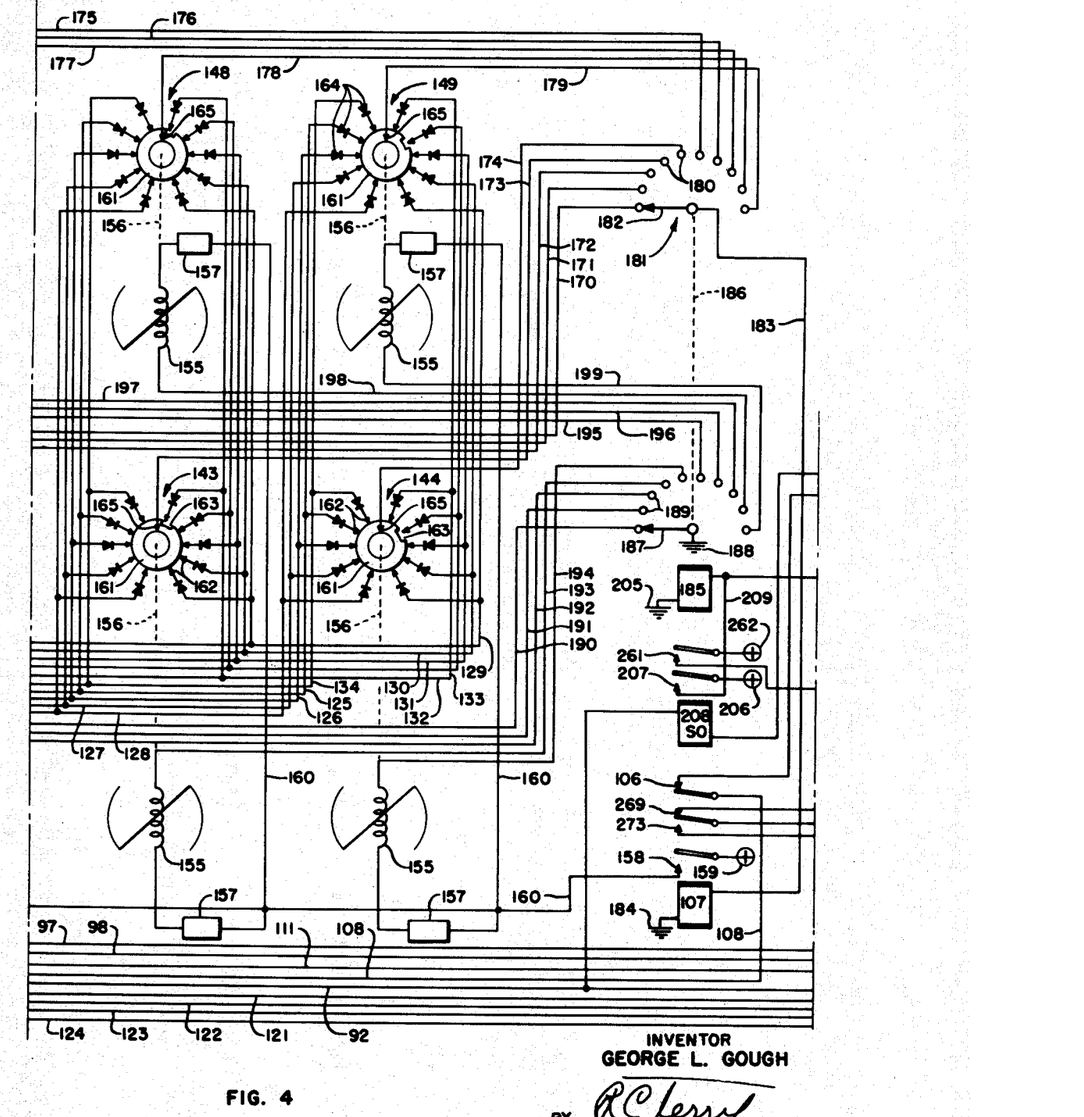

In the control unit 22 there are provided a plurality of registering switches 140 to 149 shown in FIGS. 3 and 4 which record the values of the digits transmitted thereto by the diode matrix 25. Each of these switches is provided with a driving solenoid 155 of the same general type as is illustrated in Leland Patent No. 2,501,950, which drives a shaft 156 shown diagrammatically as a dotted line in each switch. The shafts 156 are rotated step by step by their associated solenoid 155 as long as current is supplied to the solenoid through interrupter control devices 157, individual to each switch, and of a type well known in the art. All of the solenoids 155 are connected through their respective control devices 157 to make contact 158 of solenoid control relay 107 which upon energization will connect positive battery at a source 159 to a lead 160 common to all of the solenoids 155.

Each of the shafts 156 drives a contact ring 161 each associated with ten contact brushes 162 disposed about the periphery of their associated ring in equally spaced relation. Each contact ring 161 has a single cutout 163 in it whereby one and only one of the ten contact brushes associated with each contact ring is out of electrical contact with its contact ring 161 in each stepped position of the ring 161. The contact brushes 162 of each switch 140 to 149 are individually connected through a rectifier 164 to the leads 125 to 134.

Each of the contact rings 161 has associated with it a contact brush 165 which is always in contact with its associated contact ring. The contact brushes 165 for the switches 140 to 149 are connected to leads 170 to 179, respectively, which are in turn connected to the stationary contacts 180 of a stepper switch 181. The switch 181 has a brush 182 which may be rotated in a step by step motion, to engage the contacts 180 sequentially. The brush 182 is connected through a lead 183 to one side of the winding of the solenoid control relay 107, the other side of the winding of which is connected to ground at 184.

Step by step rotation, as is usual in switches of the type of switch 181, is imparted to brush 182 by an electromagnet 185 upon the de-energization of the electromagnet. The magnet 185 effects the step by step rotation of brush 182 through the instrumentality of a shaft 186 which also drives a brush 187 connected to ground at 188 and designed to sequentially supply ground potential to a plurality of contacts 189 similiar to contacts 180. The contacts 189 are individually connected through leads 190 to 199 to the driving solenoids 155 of the registering switches 140 to 149, respectively.

Energization of the magnet 185, which has one end of its winding connected to ground at 205, may be effected by connecting positive battery at 206 through make contacts 207 of a register starting relay 208 to a lead 209 connected to the other end of the winding of the magnet 185. The relay 208 is energized to close contacts 207 each time the reader 23 closes contact 94 in a circuit from positive battery source 93 (FIG. 5) through closed contacts 110, lead 111, switch 112 and contact 94 over lead 92, the winding of relay 208, a pair of normally closed contacts 210 of a reader and register control relay 211 (FIG. 5), normally closed contacts 106 of solenoid control relay 107, lead 108, normally closed contacts 104 of reader control relay 95 (FIG. 2) to ground at 105.

In the control unit 22 (FIG. 5) there are provided a group of relays for controlling various functions of the reader 23 and recording switches 140 to 149. These relays include a reset control relay 212, a reader and register stepping relay 213, a transfer relay 214 and a holding relay 215 which serve to control the functions indicated by the names assigned to them.

In addition, the control unit 22 contains (FIG. 5) the motor and brake control relay 100 as well as other machine controlling relays, namely, a negative direction control relay 216, a rapid traverse control relay 217 and a vertical axis control relay 218. These last named relays are controlled by commands received from the tape reader 23 and also by a pair counter controlled relays 219 and 220.

Figure 5:
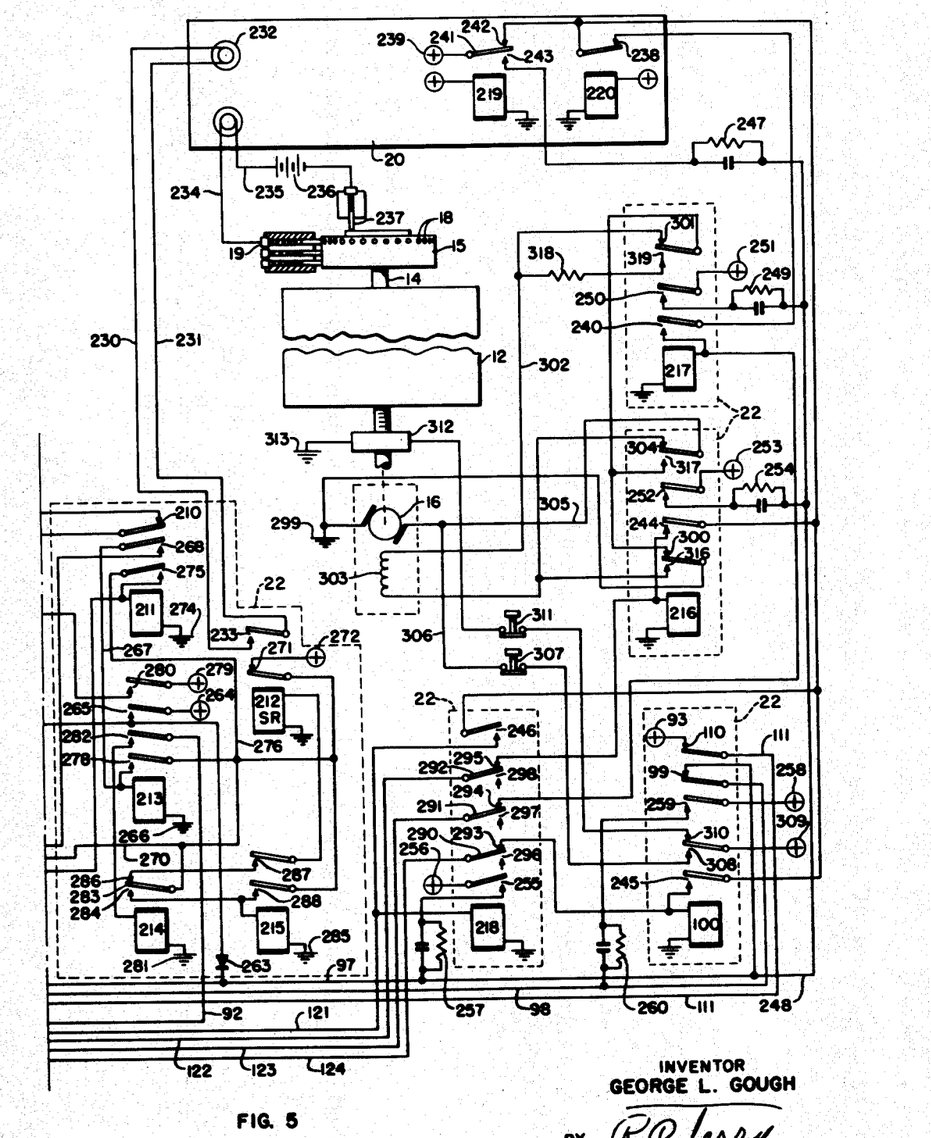

The electronic counter 20, which is illustrated diagrammatically in FIG. 5, may be any one of a number of commercially available counters capable of being set by drive shafts such as the shafts 156 of the switches 140 to 149, and operable to count pulses fed to it from the commutator 15 until there is a coincidence between the number registered in the counter under control of the shafts 156 and the number of pulses from the commutator, and to control the relays 219 and 220 as a result of the counting operation. In the counter 20 there are provided ten settable elements (not shown) which are set to positions corresponding to the individual positions of the contact rings 161 and shafts 156 of the registering switches 140 to 149.

In FIG. 5 of the drawings the counter 20 is diagrammatically illustrated as having two input leads 230 and 231 which go to a reset device 232 in the counter. The circuit for resetting the counter through the operation of the reset device 232 is completed by closing a contact pair 233 of reset control relay 212. In addition to the two input leads 230 and 231, the counter is provided with a pair of input leads 234 and 235. The input lead 234 is connected to the pick-off device 19 and the lead 235 is connected through a power source 236 to a brush 237 which continuously engages an input portion of the commutator 15 driven by the shaft 14. In the operation of the last described circuit, each time one of the pins 18 on the commutator 15 passes the pick-off device 19 a pulse will be fed into the counter thereby to count the increments of rotation of the shaft 14. As the counter operates in counting the increments of rotation of the shaft 14 and thereby reads out the position of its settable elements which have been set by the shafts 156 of the register switches 140 to 149, the counter will energize a counter controlled relay 220 as the counter approaches the end of a count of the number fed into the counter by the upper level of register switches 145 to 149. These register switches register the digits which have been read by the tape reader for controlling a rapid traverse of the blank supporting table 12. The energization of the relay 220 as the table 12 approaches the end of its rapid traverse will break a normally closed contact pair 238 thereby to remove positive battery at a source 239 from a locking contact pair 240 of rapid traverse control relay 217.

The second control relay 219 upon being energized will transfer the positive battery source 239 from fixed contact 242 to fixed contact 243. The counter control relay 219 operates at the end of each counting operation whether it be a counting operation initiated by the upper level of register switches 145 to 149 or a counting operation which had been initiated by the lower level of register switches 140 to 144. The transfer contact 241 in its normal position supplies positive battery from source 239 through contact 242 to a locking contact 244 of the negative direction control relay 216, to a locking contact 245 of motor and brake control relay 100 and to a locking contact 246 of vertical axis control relay 218 to lock any one of these relays which has been operated in an energized condition until relay 219 is operated.

The make contact 243 of relay 219, upon energization of relay 219, will connect positive battery source 239 through a network 247. The other side of the network 247 is connected to lead 97 through a lead 248 and contact 99 of de-energized relay 100 to lead 98 which extends over to the reader stepping magnet 96. Upon energization of the relay 219 a one shot pulse will therefore be transmitted through the network 247 to operate the reader stepping magnet 96 provided the motor and brake control relay 100 is not energized. This one shot pulse fed to the reader stepping magnet 96 will cause the reader to advance and sense the next series of perforations in the tape 24.

A one shot pulse may also be fed to the reader stepping magnet 96 from a network 249 through make contact 250 of rapid traverse control relay 217 when relay 217 is energized by supplying positive battery from a source 251 through the network 249 to the lead 248. Similarly, the negative direction control relay 216 upon energization will close a make contact 252 to connect battery from a source 253 through a one shot network 254 to the lead 248. The vertical axis control relay 218 is also provided with a make contact 255 which upon energization of the relay 218 will connect a positive battery source 256 through a one shot network 257 to the lead 248. These one shot pulses from the networks 247, 249, 254 and 257 are directed to the reader stepping magnet 96 only when the motor and brake control relay 100 is in a de-energized condition. When the motor and brake control relay 100 is energized it will connect positive battery at a source 258 through a make contact 259 and a one shot network 260 directly to a lead 98 which extends over to the reader stepping magnet 96. The reader stepping magnet 96 may also be energized, provided that the motor and brake control relay 100 is de-energized by the operation of register starting relay 208 which in closing its contact 261 will connect a positive battery source at 262 through a diode rectifier 263 to the lead 97 and back through contacts 99 of motor and brake control relay 100 to lead 98.

The stepping magnet 96 may also be energized to step the tape upon energization of reader and register stepping magnet 213 which in operating will connect a positive battery source at 264 through its make contacts 265 and through the rectifier 263 to the lead 96. The reader and register stepping relay 213 is operated upon operation of the reader and register control relay 211, provided the solenoid control relay 107 is de-energized, over a path from ground at 266 through the relay 213 to lead 267, make contacts 268 of relay 211, break contact 269 of solenoid control relay 107, lead 270, break contacts 271 of reset control relay 212 to positive battery source at 272.

If solenoid control relay 107 is operated and reset control relay 212 is not operated positive battery at source 272 will be connected through the break contact 271 of reset control relay 212 and over lead 270 and through make contact 273 of relay 107 to the winding of relay 211 which is grounded at 274. Relay 211 upon energization will lock up under control of its locking contacts 275 which are connected through lead 276 and normally closed contacts 271 to battery source at 272. When relay 213 operates, it will lock operated through its locking contacts 278 and normally closed contact 271 of reset control relay 212 to battery source at 272. When reader and register stepping relay 213 is energized it will also supply positive battery from a source 279 through its make contact 280 to energize the stepping magnet 185. When the reader and register stepping relay 213 is locked up through its locking contacts 278 it will connect one side of the winding of the transfer relay 214, the other side of which is grounded at 281, through its make contacts 282 to lead 92. The next pulse coming over lead 92 from stop contact 94 in the reader will be directed through contact pair 282 to the winding of transfer relay 214 which in closing the contact between transfer contact 283 and fixed contact 284 will energize holding relay 215 which is connected to ground at 285 and will break the connection between transfer contact 283 and a contact 286 and a make contact 287 of holding relay 215 to the winding of reset control relay 212 which is a slow to release relay and which will hold operated long enough to release all of the relays to which it had been supplying a locking potential.

In the detailed disclosure of the control circuit in FIG. 5 the only axis control relay which is shown is the vertical axis control relay 218 but it will be understood that the apparatus is normally set to drive on the horizontal axis, consequently power for driving the motor 16 will be supplied through the contacts of the vertical axis control relay 218 when the relay 218 is in its de-energized condition. The vertical axis control relay is provided with a plurality of transfer contacts 290, 291, and 292 which in the unoperated condition of relay 218 will engage make contacts 293, 294 and 295, respectively. The transfer contacts 290, 291 and 292 are connected to the leads 124, 123 and 122, respectively, which extend over to the matrix 25. The contacts 293, 294 and 295 are connected to the windings of the motor and brake control relay 100, the rapid traverse control relay 217 and the negative direction control relay 216, respectively. Thus, if a pulse is applied to any one of the leads 122, 123 and 124 it will cause the relay 100, 216, or 217 that it is associated with to be energized.

The transfer contacts 290, 291 and 292 also have associated with them a series of make contacts 296, 297 and 298 which when the vertical axis control relay 218 is energized will direct the pulses from the leads 124, 123, and 122 to motor and brake control, negative direction control, and rapid traverse control relays, respectively, for the vertical axis motor not shown.

In its de-energized condition the negative direction control relay 216 will connect ground at 299 through its break contact 300 and break contact 301 of de-energized rapid traverse control relay 217 to a lead 302 which connects to one end of the winding of winding 303 of motor 16. The negative direction control relay 216 will also connect the other side of the winding 303 through its break contact 304, a lead 305, a lead 306, an emergency stop switch 307 and make contact 308 of motor and brake control relay 100 to positive battery source at 309 provided the motor and brake control relay 100 is energized. The lead 306 and switch 307 will also serve to supply positive battery to one side of the armature of the motor 16 whereas ground at 299 is permanently connected to the other side of the armature circuit of the motor 16. When motor and brake control relay 100 is de-energized the battery source at 309 will be connected through a make contact 310 and an emergency manually operable brake release switch 311 to a magnetic brake 312 which is connected to ground at 313.

When the negative direction control relay 216 is energized, its transfer contacts which had connected the power source to the winding 303 and armature circuits of the motor 16 to drive the motor in one direction will reverse these connections by engaging with the make contacts 316 and 317 instead of the break contacts 300 and 304, respectively, thus to drive the motor in the opposite direction when the negative direction control relay is energized. Similarly, the rapid traverse control relay 217 will, when energized, reverse its transfer contact and instead of feeding power to the motor directly through lead 302 and break contact 301 will connect resistance 318 into the field circuit of the motor 16 by breaking with contact 301 and making contact with a contact 319.

*Operations*

In order to illustrate the complex type of program which the apparatus will handle it will be assumed that the work piece which is placed on the supporting table 10 has an outwardly extending projection which is to be milled to a depth as controlled by the position of the chuck 10 carrying the milling tool and that there is also a space in the work piece which is not in the path of the milling tool so that the work piece should first be moved for predetermined distance for example 14.062 inches in a negative direction along the "X" or horizontal axis at high speed, since no milling is being performed and that the work piece need then be moved one inch at slow speed to cut the projection on the work piece before another command is fed to the machine tool.

In order to control the machine tool in this fashion the program tape will have to be punched to indicate that a traverse of the work table of 15.062 inches along the horizontal axis in the negative direction will need to be traveled by the table and that one inch exactly of this travel is to be an operative or milling operation and that this will be preceded by 14.062 inches of travel at a rapid speed. In order to transmit this type of control to the machine it will be necessary that the tape has punched in it the code representation of the first digit 1, then the digit 5, then 0, then the digit 6, and then the digit 2, followed by a space and then the digit 1, the digit 4, 0, the digit 6, the digit 2, the representation of minus ("—"), and the representation of G and then the representation of blank. This series of commands will control the machine to establish first the overall dimension through which the work table is to be moved, then the portion of the traverse of the work table which is to be accomplished at a rapid feed, then the axis in which the movement is to take place, the direction of movement along that axis, the power signal to start feeding the work piece and a blank signal to establish that the end of this control cycle has taken place.

The machine is normally set up for movement on the "X" axis and consequently the control signal for the vertical axis, is in the example selected, eliminated from the command which is programmed into the tape. The apparatus is also set up to travel at a slow or operating rate of traverse. The apparatus is also arranged normally to travel in the positive direction and consequently, since it is desired, in the program chosen as an example to feed the apparatus in the negative direction the minus symbol is transmitted to the machine as a result of its being programmed in the tape. After the distance, direction and speed commands are received by the control unit as a result of their being punched in succession on the tape 24, the signal to begin operation or G will be transmitted and the milling operation will start. This milling operation will continue until the completion of the operation and then the machine will transmit back to the tape reader 23 the information that it has completed this operation and a blank will be transmitted by the tape reader. It should be noted that the absence of a V or Z symbol indicates that the axis of operation of the machine is the "X" axis which does not have to appear in the tape.

After a tape has been properly punched to control the machine it may be fed into the reader 23 as is usual in tape readers used in the printing telegraph art. In order to start the machine operation it is necessary to start the reader 23 to operate and this is effected by momentarily closing a reader start switch 52 simultaneously with the main machine control switch 112. Closure of switch 52 will supply power from a source 53 to the lead 98 to initiate operation of the reader by momentarily energizing the stepping magnet 96 of the reader. This will cause the first sensing operation of the reader 23 and since the main machine control switch 112 remains closed the succeeding sensing operations will proceed automatically. With a tape in the reader 23 the main machine control switch 112 (FIG. 2), may be closed to supply positive battery from source 93 (FIG. 5), through normally closed contacts 110, over lead 111 to the stop contact 94 in the reader, FIG. 2. The first transverse row of perforations in the tape, as indicated previously, will be representative of the digit 1 and the reader will read this digit and set up a representation on the transfer contact sets 31 to 35. The following chart indicates the positions which the transfer contact sets 31 to 35 must assume in order for a pulse to be fed out over any one of the output leads 60 to 78. It should be borne in mind that the positive battery source at 93 (FIG. 5), in being fed over lead 111 and through the main machine control switch 112 will be permitted to pass out on one of the leads 60 to 78 only if that particular lead is not connected to ground at 90 (FIG. 1), through the transfer contact sets 31 to 35. In the chart the movable contacts 36 to 40 are shown either M or S, that is, in either their marking or spacing condition.

| Output Lead | Command | Movable Contacts | | | | |
|---|---|---|---|---|---|---|
| | | 36 | 37 | 38 | 39 | 40 |
| 60 | space | S | S | M | S | S |
| 61 | "V" vertical | S | M | M | M | M |
| 62 | "—" negative direction | M | M | S | S | S |
| 63 | "F" fast | M | S | M | M | S |
| 64 | "G" go | S | M | S | M | M |
| 65 | 9 | S | S | S | M | M |
| 66 | 8 | S | M | M | S | S |
| 67 | 7 | M | M | M | S | S |
| 68 | 6 | M | S | M | S | M |
| 69 | 5 | S | S | S | S | M |
| 70 | 4 | S | M | S | M | S |
| 71 | 3 | M | S | S | S | S |
| 72 | 2 | M | M | S | S | M |
| 73 | 1 | M | M | M | S | M |
| 74 | 0 | S | M | M | S | M |
| 75 | FIGURES | M | M | S | M | M |
| 76 | LETTERS | M | M | M | M | M |
| 77 | LINE FEED | S | M | S | S | S |
| 78 | CARRIAGE RETURN | S | S | S | M | S |

With the main machine switch 112 closed and the tape reader in operative condition, the first transverse row of holes in the tape 24 being representative of the digit 1 will, as indicated by the chart, move the movable contacts 36, 37, 38, 39 and 40 of the transfer contact sets 31 to 35, inclusive, to a position where contact 36 will be in engagement with contact 46, contact 37 will be in engagement with contact 47, contact 38 will be in engagement with contact 48, contact 39 will be in engagement with contact 44, and contact 40 will be in engagement with contact 50. With the transfer contact sets in this condition the diode matrix 25 will connect positive battery from source 93 (FIG. 5), over lead 111, through main machine control switch 112 and contact 94, which will move to the closed position when the reader finishes reading the first row of perforations in the tape 24, over lead 92 and out over leads 73 and 133 to contact brush 162 at the number 1 position of each of the registering switches 140 to 149 and through the contact rings 161 to the contact brushes 165. The contact brush 165 associated with the switch 140 is the only one of the contact brushes 165 which can find a path through its lead 170 to the stepper switch 181 since the brush 182 of the stepper switch 181 is in engagement with its first contact. The battery source thus fed through the matrix and the registering switches 140 to 149 will be fed out over lead 183 and through the solenoid control relay 107 to ground at 184, thereby energizing the relay 107.

Energization of solenoid control relay 107 will connect battery source at 159 through make contacts 158 to the lead 160 and through all of the control devices 157 to one side of the winding of all of the driving solenoids 155. The only driving solenoid 155 which is operable at this time is the solenoid 155 associated with register switch 140, since it has the other side of its winding connected through lead 190 to the number 1 contact 189 of the lower bank of contacts of stepper switch 181. The brush 187 of the lower bank of stepper switch 181 is grounded at 188 and consequently power will be fed to operate the driving solenoid 155 associated with the register switch 140. This driving solenoid 155 of the register switch 140 will be operated step by step until brush 162 at the number 1 position of register switch 140 is aligned with the cutout 163 in the contact ring 161. Since the register switch 140 is connected to the counter 20 the counter will be set at its number 1 position in its highest order registering device (not shown).

The pulse that was fed from the stop contact 94 over the lead 92 is also directed through the winding of the register starting relay 208 at break contact 210 of reader and register control relay 211 and break contact 106 of solenoid control relay 107, over lead 108 through break contact 104 of reader control relay 95 to ground at 105 thereby tending to operate the register starting relay 208, but the register starting relay 208 is slow to operate having an operating time for example of approximately 60 milli-seconds. The solenoid control relay 107 on the other hand is a fast to operate relay having an operation interval of only about 15 milli-seconds, consequently, contact 106 associated with solenoid control relay 107 will open prior to the operation of register starting relay 208, thus to prevent the operation of register starting relay 208 until solenoid control relay 107 is again de-energized.

As soon as solenoid control relay 107 is de-energized, due to one of the register switches 140 to 149 reaching its selected position, positive battery source at 93 will be connected through lead 111 and through the main machine control switch 112 and stop contact 94, lead 92 to one side of the winding of the register starting relay 208 and from the other side of the winding of the relay 208 through contact 210 of reader and register control relay 211, contact 106 of solenoid control relay 107 to lead 108 which is grounded at 105 through contact 104 of reader control relay 95.

When relay 107 operated it closed a path between its transfer contact and fixed contact 273 to supply positive battery from source 272 to break contact 271 of slow to release reset control relay 212 to the winding of reading and register control relay 211. Register and reader control relay 211 will thus pull up in a circuit from positive battery source at 272 to ground at 274 at the winding of the relay and will lock operated over its locking contacts 275 until the reset control relay 212 operates. When the reader and register control relay 211 operates it will open its normally made contacts 210 and thus will interrupt the path to the register starting relay 208 until the reset control relay 212 is energized.

As soon as the contact ring 161 reaches a position where the cutout 163 is aligned with the brush 162 the path to energize solenoid control relay 107 will be interrupted. At this point when solenoid control relay 107 releases, its transfer contact will engage fixed contact 269 to energize reader and register stepping relay 213 in a circuit from ground at relay 213 through lead 267, closed contact 268, fixed contact 269 of transfer contact of solenoid control relay 107 and thence over lead 270 to positive battery source 272 through normally closed contact 271 of reset control relay 212.

The reader and register stepping relay 213 will lock up in a path from ground at 266 through the winding of the relay 213, locking contact 278, contact 271 of reset control relay 212 to battery at 272. When reader and register relay 213 operates it will close its make contact 282 to energize transfer relay 214 in a circuit from ground at 281, through the winding of relay 214, make contact 282 of reader and register stepping relay 213 and back to battery at 93 (FIG. 5) through lead 92, stop contact 94, switch 112, lead 111 and break contact 110 of motor and break control relay 100. Relay 213 will also complete a circuit to energize the stepping magnet 96 in the reader in a circuit from ground at 103 through the winding of the magnet 96 (FIG. 2), over lead 98, normally closed contacts 99 of the motor and brake control relay 100 (FIG. 5), thence over lead 97 through the rectifier 263 to make contact 265 which is connected to battery source at 264.

Operation of relay 213 will also connect battery at source 279 through its make contact 280 through the winding of the stepping magnet 185 to ground at 205. This path for the magnet 185 will operate it and will cause it to step its brushes 182 and 187 into engagement with the second contacts 180 and 189, respectively, of the upper and lower banks of switch 181. The operation of the transfer relay 214 under control of the reader and stepping relay 213 will effect the energization of holding relay 215 by completing a circuit from ground at 285 through the winding of relay 215, make contact 284, of transfer contact 283 and break contact 271 of relay 212 to battery at 272. Holding relay 215 will lock up in a path through its locking contact 288 and normally made contact 271 of reset control relay 212 to battery at 272.

When stepping magnet 96 operates a reading cycle of the reader 23 will be initiated. The first operation that occurs is the opening of stop contact 94 which when it opens causes the transfer relay 214 to be de-energized. The de-energization of transfer relay 214 causes its transfer contact 283 to move into engagement with the fixed contact 286 thereby to energize reset control relay 212. The reset control relay 212, as pointed out hereinbefore, is a slow to release relay and when it is pulled up, upon the release of transfer relay 214 in a circuit from ground at reset control relay 212 through the winding of the relay 212 make contact 287 of energized holding relay 215, contacts 286 and 283 of transfer relay 214 and its own back contact 271 to battery source at 272, it will hold energized for an appreciable length of time for example, about 30 milli-seconds. The opening of break contact 271 removes the locking battery from relays 211, 213 and 215. The release of reader and stepping relay 213 causes make contact 280 to be opened and consequently cuts off the battery supply 279 from the stepping electromagnet 185. Release of the magnet 185 will result in the brushes 182 and 187 stepping to engagement with their second contacts 180 and 189, respectively. This prepares the switch 141 in the group of registering switches 140 to 149 for operation when the next row of perforations in the tape 24 are read.

In the program as set up on the tape the next digit to be read is the digit 5 which will be read by the reader and the reader will set its transfer contact sets 31 to 35 in a position such that positive battery source at 93 will be connected over contact 110 of motor and brake control relay 100 (FIG. 5), through lead 111, main switch 112 and stop contact 94 to output lead 69 and thence over lead 129 to all of the registering switches 140 to 149. However, only switch 141 will be effective to supply operating power to its stepping solenoid 155 because the brushes 182 and 187 are in engagement with the second of their sets of contacts in the switch 181. The control circuits will operate in the manner described in connection with the entry of the first digit into the registering switches and into the counters 20. If it happens that one of the registering switches 140 to 149 is already set in the position called for by the row of perforations on the tape, the solenoid control relay 107 will not operate since the brush 182 will not find battery on any one of the leads with which it happens to be associated at that time because the brush 162 of the registering switch which is effective at that time will be at the position where the cutout 163 is formed. However, the register starting relay 208 will be energized in a circuit from positive battery source 93 (FIG. 5), through contact 110 of the motor and brake control relay 100, over lead 111, main machine switch 112, stop contact 94, lead 92, the winding of register starting relay 208, contact 210, which will be closed at this time, on reader and register control relay 211, contact 106 of solenoid control relay 107 which is at this time de-energized, and thence over lead 108, and through contact 104 of reader control relay 95 to ground at 105. This will cause the switch 181 to be stepped to its next position and stepping magnet 96 will be energized.

The registering switches 140, 141, 142, 143 and 144 will be operated in succession to register in them and in the electronic counter 20 the five digits comprising the overall dimension in inches and thousandths of an inch and then the reader will step the tape 24 to its next position where the "space" symbol is perforated in the tape. The reading of the space symbol in the tape will result in a setting of the transfer contact set 31 to 35 in positions such that the battery source supplied by the stop switch 94, after the transfer contact sets have been set to their space positions, will be directed out of the diode matrix 25 on output lead 60 and thence through the rectifier 109 and lead 120 to energize the reader control relay 95 thereby closing the make contact 102 of relay 95 and supplying positive battery from source 101 over lead 97, closed contact 99 of motor and brake control relay 100 and lead 98 to the reader solenoid 96 and through the reader solenoid 96 to ground at 103. This will cause the reader to step one place and will result in no input to either the registering switches 140 to 149 or to the counter 20.

When the reader control relay 95 operates it will open contacts 104 and remove ground at 105 from lead 108 thereby to prevent the possibility of any of the group of relays 211 to 215 being operated. The operation of reader control relay 95 thus prevents any registering operation from occurring accidentally.

Since the next command perforated in the tape 24 is the digit 1 of the rapid traverse dimension the reader in stepping out of the position where the symbol for space was perforated in it will then sense the digit 1 and this digit will be stored in registering switch 145. The operation of the reader will progress in the same manner in which it progressed in registering the overall dimension in registering switches 140 to 144 and will set the registering switches 145 to 149 in positions representing the digits 1, 4, 0, 6 and 2, respectively, in the registering switches and also in corresponding devices (not shown) in the electronic counter 20.

After reading the last of the rapid traverse dimension digits the reader will step to its next position where it will read the symbol for minus ("—"), indicating that the direction of travel of the supporting table 12 should be in a negative direction. When the reader senses the symbol for minus in the tape 24 it will set the transfer contact sets 31 to 35 in positions such that a pulse will be fed out over output lead 62 and through its rectifier 109 to lead 122. This positive battery pulse which originates at positive source 93 is fed through closed contact 110 of motor and brake control relay 100 out over lead 111 through main machine control switch 112 to the stop contact 94. Since the stop contact 94 is closed as soon as the transfer contact sets have been set, this pulse will then be directed over lead 92 to output lead 62 after passing through resistor 91 and thence through rectifier 109, lead 122, transfer contact 292 and fixed contact 295 of vertical axis control relay 218 (FIG. 5), to negative direction control relay 216 and through the winding of this relay to ground. Negative direction control relay 216 upon being energized will lock up to a positive battery source 239 in the counter 20 which is fed to the relay through transfer contact 241, fixed contact 242 and locking contact 244 of the relay 216. Thus, the negative direction control relay will remain locked up until counter controlled relay 219 in the counter 20 is operated at the end of the program.

After locking up the negative direction control relay 216, the reader 23 will again be stepped. This operation is effected by the closure of contact 252 of negative direction control relay 216 which will then supply positive battery at 253 to the network 254 which will place a single pulse on lead 248 that will be directed over closed contact 99 of motor and brake control relay 100 to lead or conductor 98, through the winding of reader solenoid 96 to ground at 103, thus to step the tape in the reader to its next position. When the negative direction control relay 216 is energized it will shift its transfer contacts so that power will be supplied to the motor 16 to drive it in a reverse or negative direction.

When the reader 23 is stepped due to the energization of the negative direction control relay 216, the next command perforated in the tape will be the command indicating that a rapid traverse of the work supporting table 12 is to be effected. Consequently, the reader 23 will set its transfer contact sets 31 to 35, in a condition such that a pulse will be fed out of the matrix 25 on output lead 63 and through the rectifier 109 to lead 123. By reference to FIG. 5 it will be seen that the lead 123 will direct this pulse over transfer contact 291 of de-energized relay 218, fixed contact 294 and then through the winding of the relay 217 to ground at the relay 217. This will cause the rapid traverse control relay 217 to be energized.

The energization of the rapid traverse control relay 217 will cause the resistance 318 to be connected in the field circuit of the motor 16 and will also cause a pulse to be transmitted from positive battery source 251 through make contacts 250 of rapid traverse control relay 217 through the network 249 to apply a single shot pulse on lead 248. As described in connection with the operation of the negative direction control relay a pulse on the lead 248 will be directed back to the reader and will cause the reader to step the tape 24 to its next position. Rapid traverse control relay 217 will lock up over its make contact 240 to the break contact 238 of counter control relay 220 and thence to positive battery source through fixed contact 242 and transfer contact 241 of counter control relay 219.

When the pulse fed through network 249 associated with rapid traverse control relay 217 is applied to lead 248 and the reader 23 is therefore stepped to its next position the symbol "G" will be read by the tape reader 23. This will cause the transfer contact sets 31 to 35 to be set in a position such that a pulse will be fed out over output lead 64 through its associated rectifier 109 to lead 124. By reference to FIG. 5 it will be seen that lead 124 is connected through transfer contact 290 and break contact 293 of de-energized vertical axis control relay 218 to the winding of motor and brake control relay 100, the other side of the winding of which is connected to ground. This circuit will cause the motor and brake control relay 100 to be energized and when relay 100 is energized it will lock up over its locking contact 245 through break contact 242 and transfer contact 241 of counter control relay 219 to positive battery source at 239. Thus, motor and brake control relay 100 will be operated and will lock operated under control of the counter control relay 219. In operating the motor and brake control relay 100 will open the path from positive battery source at 309 through its break contact 310 and the emergency break release switch 311 to the magnetic brake 312 thus releasing the brake. The positive battery source 309 will then be connected through the transfer contact of motor and brake control relay 100 through fixed contacts 308 and emergency stop switch 307 to one side of the armature circuit of the motor 16, the other side of which is grounded at 299. This will start the motor 16 to drive in a negative direction at high speed.

The motor and brake control relay 100, upon operating, will connect battery source 258 through its make contact 259 and the network 260 to lead 98 leading to the reader stepping magnet 96. This will cause one pulse to be transmitted to the reader stepping magnet 96 which will step its tape 24 to the next position. Relay 100 in operating will also break the connection between leads 97 and 98 through its break contact 99 thus to prevent any stepping pulses from being fed to the reader 23 until the motor and brake control relay is de-energized. The motor and brake control relay 100 will also disconnect the battery source 93 from lead 111 thereby preventing any pulses from being fed out through the stop contact 94 until the relay 100 is again de-energized.

The apparatus is now in a condition such that the blank or work supporting table 12 will move in a negative direction at high speed. As the table 12 is driven in a negative direction at high speed the pins 18 in passing the pick off device 19 will transmit one pulse to the counter 20 each time a pin passes the pick-off device 19. These pulses which are fed into the counter over leads 234 and 235 (FIG. 5) will cause the registering devices (not shown) in the counter 20, to gradually return to their normal or zero positions. At the end of the amount of travel of table 12 at high speed, the counter 20 will be effective to energize counter control relay 220. When counter control relay 220 operates it will open its normally made contact 238 to disconnect battery at 239 over transfer contact 241 and contact 242 through normally made contact 238 to the locking contact 240 of the rapid traverse control relay 217. This will cause the rapid traverse control relay 217 to be deenergized and will shift the transfer contact of rapid traverse control relay 217 to a position where it engages fixed contact 301 thereby cutting the resistance 318 out of the power circuit to the field coil 303.

The counter 20 will continue to count off, in thousands of an inch, the overall dimension which had been put into it as the milling tool performs its milling operation. After the table 12 has covered the full overall distance of its desired travel, that is, 15.062 inches, the counter 20 in returning to its normal condition, will energize counter control relay 219 thereby to attract transfer contact 241 and transfer the battery at 239 from contact 242 to contact 243. Battery at 239 will then be directed over transfer contact 241 and fixed contact 243 to apply a pulse through the network 247 to lead 248. When this one shot pulse is fed through the network 247, over the lead 248 it will be directed over lead 97 to contact 99 which is now closed due to the fact that the battery for holding motor and brake control relay 100 operated was disconnected from the locking contact 245 of relay 100 immediately upon the operation of relay 219 and accordingly motor and brake control relay 100 was de-energized. When motor and brake control relay 100 was thus de-energized it restored battery at 93 to operative association with lead 111. With the restoration of motor and brake control relay 100 to its deenergized condition the apparatus will be restored to condition to receive another program.

Although a specific embodiment of the invention has been shown in the drawings and described in the accompanying specification, it is to be understood that this invention is not limited thereto, but is capable of modification and rearrangement without departing from the spirit and scope of the invention.

What is claimed is:

In a machine tool having movable elements and drive means for imparting movement to the movable elements, a control apparatus comprising means for measuring the amount of movement of said elements, a tape reader operable step by step for reading a permutation code perforated in a program tape at each step and having transfer contacts, one individual to each unit of the code, which contacts are permutatively set to either a marking or a spacing position under control of the tape at each step, a marking contact and a spacing contact individually associated with each of said transfer contacts for engagement by said transfer contacts upon movement of said transfer contacts to their marking or spacing positions, a reader controlled matrix having input leads connected to said marking and spacing contacts for translating the code as read by the reader, in terms of the position of said transfer contacts, into a single line command at each step of the reader, said reader controlled matrix having a plurality of output leads individually rendered effective to transmit said single line commands, a registering mechanism connected to certain of said output leads for receiving and registering selected ones of said commands, a counter controlled by said registering mechanism for registering information, controlling circuits for controlling the operation of said drive means and connected to others of said output leads for control by others of the single line commands, means controlled by the movable elements of the machine and electrically connected to the counter to read out from the counter the information registered therein, and means connecting the counter to the controlling circuits to control the time of operation of said movable elements of the machine.

References Cited in the file of this patent

UNITED STATES PATENTS

| | | |
|---|---|---|
| 2,283,240 | Trinkle | May 19, 1942 |
| 2,475,245 | Leaver et al. | July 5, 1949 |
| 2,537,770 | Livingston et al. | Jan. 9, 1951 |
| 2,710,934 | Senn | June 14, 1955 |
| 2,792,545 | Kamm | May 14, 1957 |
| 2,823,345 | Ragland et al. | Feb. 11, 1958 |

OTHER REFERENCES

"Binotrol," reprint from American Machinist, August 1, 1955, 7 pp.

"Tape and Card Controlled Machines," from Automation magazine, May 1957, pp. 83–91.